J. R. MILLER.
PLANTER.
APPLICATION FILED JULY 23, 1908.
912,396.
Patented Feb. 16, 1909.
3 SHEETS—SHEET 1.
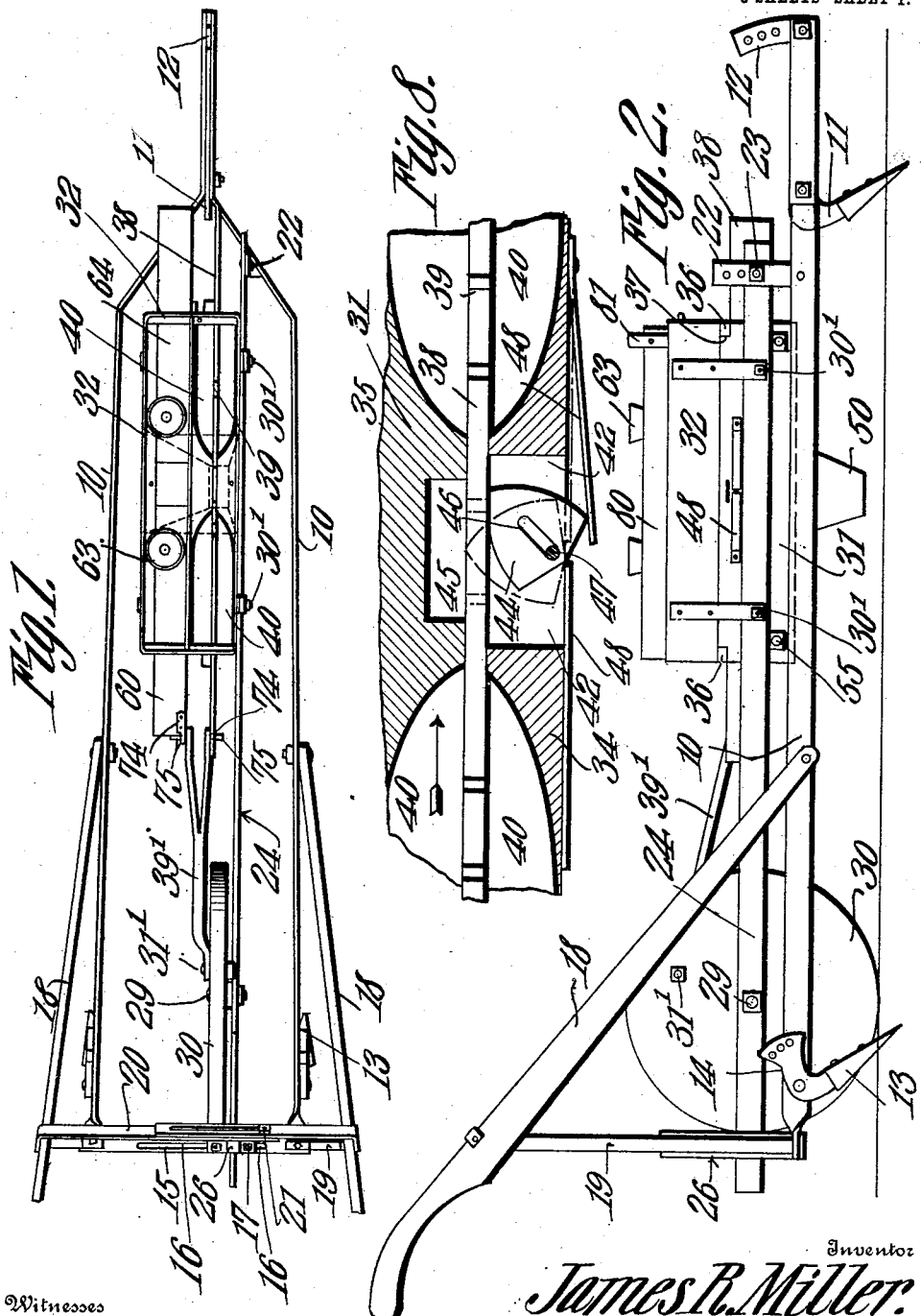
Witnesses
Inventor
James R. Miller.
By C.A.Snow & Co.
Attorneys

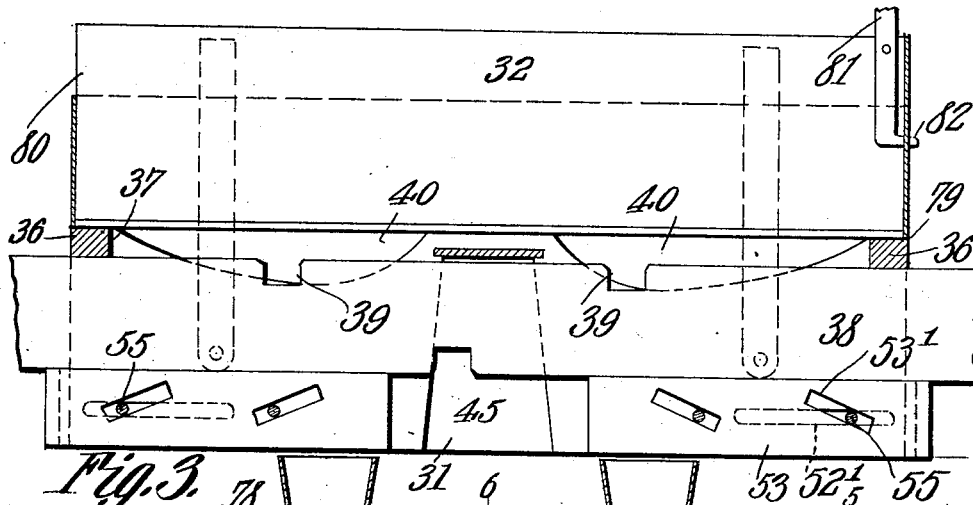
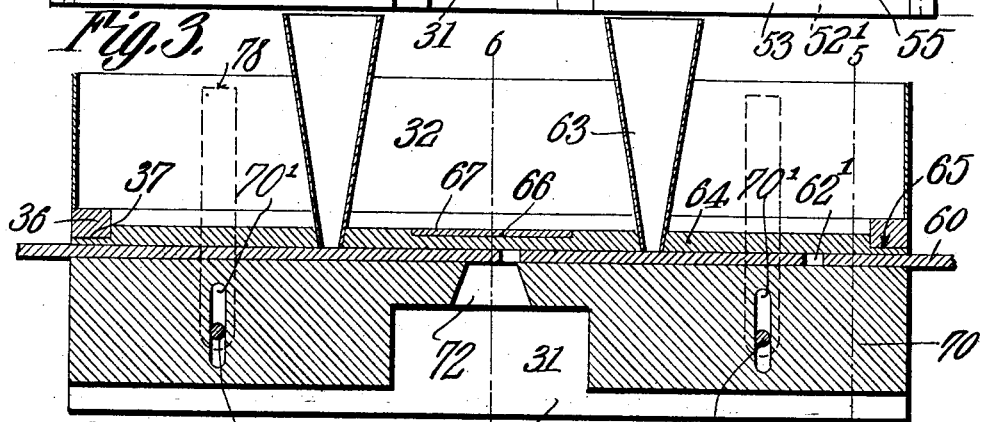
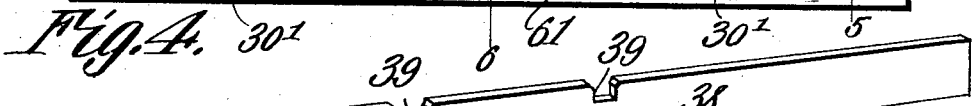
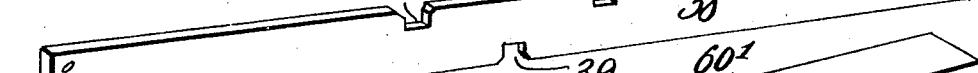
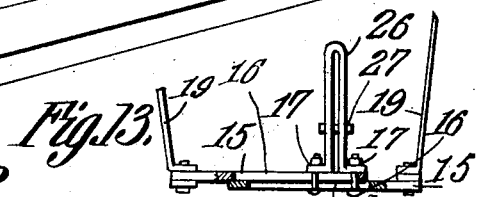

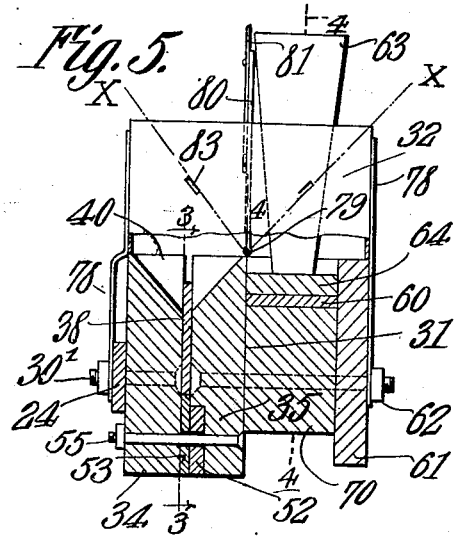
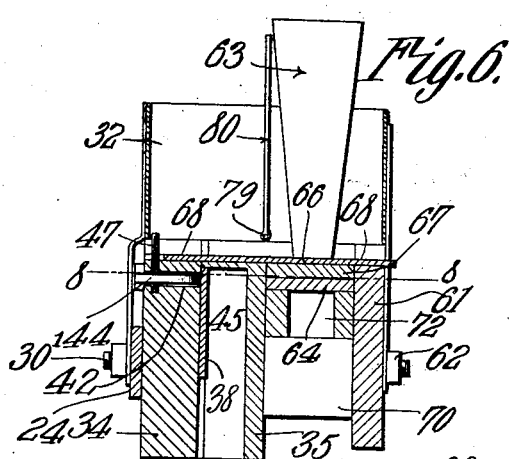
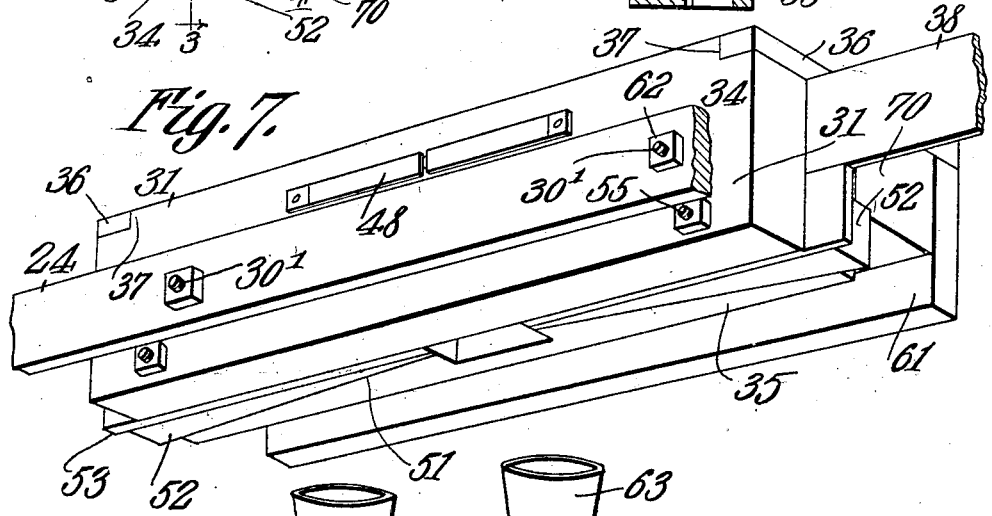
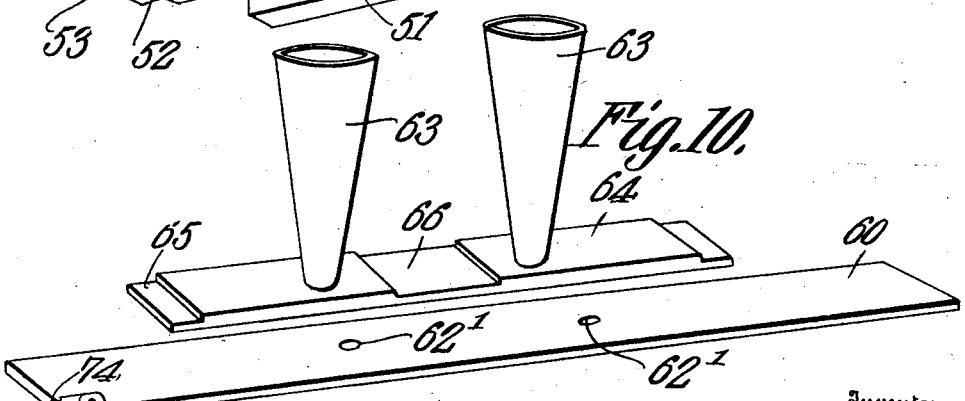

UNITED STATES PATENT OFFICE.

JAMES R. MILLER, OF McRAE, GEORGIA.

PLANTER.

No. 912,396.  Specification of Letters Patent.  Patented Feb. 16, 1909.

Application filed July 23, 1908. Serial No. 445,043.

*To all whom it may concern:*

Be it known that I, JAMES R. MILLER, a citizen of the United States, residing at McRae, in the county of Telfer and State of Georgia, have invented a new and useful Planter, of which the following is a specification.

This invention relates to corn planters and has for its principal object to provide a machine of very simple construction whereby single grains of corn may be dropped at any desired intervals, the parts being interchangeable and adjustable to permit the dropping of the grains at any distance from each other.

A further object of the invention is to provide a machine which may be readily adjusted to accommodate grain or seed of varying size and which will operate in a hopper or similar reservoir to select and feed the single grains of corn edgewise.

A still further object of the invention is to provide a novel machine of this type which may be employed for simultaneously planting other seed along with the corn, as for instance peas, or to permit the adjustment of the machine for the dropping of fertilizer as the planting progresses.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a plan view of a corn planter constructed in accordance with the invention. Fig. 2 is a side elevation of the same. Fig. 3 is a longitudinal section through the corn hopper or reservoir on an enlarged scale, the view being taken on the plan indicated by the line 3—3 of Fig. 5. Fig. 4 is a similar view on the line 4—4 of Fig. 5. Fig. 5 is a transverse section view on the line 5—5 of Fig. 4. Fig. 6 is a similar view on the line 6—6 of Fig. 4. Fig. 7 is a perspective view of the discharge mechanism looking toward the bottom of the same. Fig. 8 is a sectional plan view on the line 8—8 of Fig. 6 showing the spring tongue for forcing the seed or grain from the feeding slide. Fig. 9 is a detail perspective view of one of the feed slides detached. Fig. 10 is a similar view showing a pair of small hoppers which may be employed for planting small seed along with the grain. Fig. 11 is a detail perspective view of a feed slide employed in connection with the hoppers shown in Fig. 10. Fig. 12 is a detail perspective view of another form of feed slide which may be employed. Fig. 13 is a detail view of a part of frames.

Similar numerals of reference are employed to indicate corresponding parts throughout the several figures of the drawings.

The main frame of the machine comprises a pair of side bars 10 which gradually converge from the rear toward the front of the machine and near the front end are bent inward at an acute angle to each other, and thence are continued in parallel relations, being slightly spaced for the support of a plow or furrowing device 11, and at the extreme front end is an adjustable draft attaching means 12. The rear ends of the side bars carry covering shovels 13 which are provided with adjusting devices 14 of the ordinary construction for the purpose of adjusting the angle of the shovels or plates. The extreme rear ends of the side bars are connected by two overlapping bars 15 each of which is provided with an elongated slot 16 so that the width of the frame may be readily adjustable, and when adjusted the bars are clamped in place by a pair of bolts 17. The handles 18 are connected to the side bars and the rear portions of the handles are supported by bars 19 rising from the rear end of the frame. In order to adjust the width of the handles to corresponding width of the frame the handle members are provided with overlapping slotted bars 20 which are connected and clamped together by suitable bolts 21.

Near the front end of the frame is a bracket 22 having a series of openings for the passage of a bolt 23 on which is pivoted the forward end of a bar 24 that extends beyond the rear cross bars 15 of the frame and is guided in a vertically slotted bracket 26 carried by the upper cross bar 15. This bracket is provided with openings for the passage of bolts 17 so that it may be adjusted as the width of the frame is adjusted. The rear end of the bar is free to move vertically in the guiding bracket 26 when planting certain grades of seed, and at other times may be locked in the lower-most position by a removable pin 27, as will hereinafter appear.

The bar 24 carries a stud 29 on which is mounted a wheel 30 arranged to travel on the ground and provided with a crank pin 31'.

Secured to the bar 24 by a plurality of bolts 30' is the mechanism for holding and dropping the seed such mechanism comprising generally a lower frame 31 and an upper hopper or reservoir 32. The frame 31 includes a pair of parallel plates or bars 34 and 35 and these are partly held together by transverse bars 36 permanently secured at a point intermediate their ends to the opposite end portions of the plate 35 and seated in recesses 37 that are formed in the opposite ends of the plate 34. The two plates are spaced for the reception of a feed slide 38 which is provided with any desired number of notches 39 for the reception of single grains or to receive predetermined quantities of seed of any size, although in the present instance the machine is designed for the edgewise selecting and dropping of corn. The rear end of the slide projects beyond the rear ends of the two plates and is connected by a rod 39' to the crank pin 31' so that as the wheel 30 is rotated the slide will be reciprocated between the two plates 34 and 35. The upper edges of the central portions of the plates 34 and 35 are flat and beyond the flattened portions and extending practically to the ends of the plates are recesses 40, the upper inner edges of the plates being cut away in order to form tapering channels by which the corn or other seed may be directed into the narrow passage between the two plates 34 and 35 and thus be entered into the feed receiving notches 39. In practice the upper edge of the seed slide will project some distance above the base of the inclined recesses 40 as shown more clearly in Fig. 5, while the base of the notch or notches will be in a line somewhat below the base of the recesses so that a single grain of corn may be properly guided into the slide notches, and when entered in an edgewise direction the grains will be held in place partly by the adjacent parallel portions of the side walls of the plates 34 and 35 and as the slide reciprocates the notched portions containing the grain will be moved toward the center of the plate.

The plate 34 is provided with a horizontally disposed slot 42 arranged a short distance below the upper edge of the plate and pivotally mounted within this slot is a seed ejecting tongue 44 that is approximately shield shape in contour and is arranged to enter the seed receiving notches of the slide and throw the seed outward from the notches into a vertical groove 45 that is formed in the inner wall of the plate 35. The tongue 44 is provided with an elongated slot 46 for the passage of a vertical pivot pin 47, and the outer edge of the tongue presents two flat surfaces disposed at an obtuse angle to each other and arranged to be engaged by a pair of leaf springs 48 that are rigidly secured at one end to the outer faces of the plate 34 so that the tongue is spring held in both directions and will yield to enter a seed receiving notch no matter which direction the slide may move, the springs always tending to throw the tongue to the central position shown by dotted line in Fig. 8, while the tongue is deflected and held deflected while engaging with the solid parts of the slides and only moves to the dotted line position when one of the notches comes opposite the tongue.

It is to be observed on reference to Fig. 8 that the flaring of the inner walls of the plates 34 and 35 really forms two separate seed containing hoppers or reservoirs, and if the operating edge of the slide is provided with a single notch that moves a sufficient distance to be passed alternately to the hoppers or reservoirs it will carry the seed from the left reservoir to the central deflecting tongue where the seed will be thrown outward and then continue its movement into the right or forward reservoir, the notch will again be filled and then moving rearward the notch will again come opposite the deflecting tongue and the seed carried thereby will be thrown out into the vertical groove 45. As the slide is connected to the crank pin of the operating wheel it follows that two grains of corn or two feed operations will be accomplished for each complete rotation of the wheel and the diameter of the wheel will therefore control the distance between the discharges or hills. By increasing or decreasing this diameter, that is to say, by substituting operating wheels of larger or smaller size the distance between the hills may be increased or diminished.

The slide shown in Fig. 9 is reversible, its lower-most edge being shown with a single slot or notch, while the upper edge has two notches. If the upper edge is in operative position two grains may be fed from each of the hoppers or with a short stroke crank and the distance between the notches properly gaged each notch may feed from its own reservoir and thus the distance between the hills may be varied. The upper edge of the feed slide may, of course, be provided with three or more notches and arranged to feed from both reservoirs in order to increase the quantity of seed dropped.

Arranged below the frame 31 and in position to receive the corn or seed dropped through the vertical groove 45 is a guiding device 50 by which the grain is guided down into the furrow and protected from air currents.

In order to adjust the width of the hoppers and the distance between the plates 34, 35 for the feeding of grain or seeds of different size the lower portion of the inner face of the plate 35 is provided with opposite inclined surfaces 51 that are arranged to receive wedge blocks 52 against the flat faces of these wedge block filling pieces 53 of the same or approximately the same thickness as the feed slide and on which the feed slide 38 rests. Both the wedges ad the filling strips are provided with elongated slots 52′ and 53′ respectively for the passage of securing and clamping bolts 55 so that by adjusting the wedges in the direction of their lengths the distance between the two plates may be readily adjusted and this adjustment held by tightening the bolts 55. This will, of course, permit the substitution of slides of different thickness to accommodate the distance between the two plates.

In many cases it is desirable to plant two different kinds of seed at the same time, or to drop small quantities of fertilizer along with and adjacent to the seed and for this purpose an additional feed slide 60 is employed, said slide being arranged to travel between the outer face of the plate 35 and an additional plate 61, the two plates being secured together by a transverse bolt 62 as indicated in Fig. 5.

The slide 60 may be of the type shown in Fig. 11 for the planting of small seeds, such for instance as turnip seed, and in this case is provided with delivery openings 62′ which may be filled from the small tapering hoppers 63 that are carried by removable plate 64 as the slide is reciprocated. The opposite ends of the plate 64 are provided with transverse grooves or notches 65 which fit under the cross bars 36 and the central portion of the upper face of the plate 64 has a guiding groove 66 that receives a holding plate 67 which passes through alining slots 68 formed in the several plates 34, 35, and 61 so that the plate 64 will be held from longitudinal or transverse play.

The slide 60 is arranged immediately below the plate 64, and its delivery openings 62′ receive the seed from the hoppers 63, it being understood that the plate 64 has openings which form the discharge mouths of the hoppers. The slide 60 rests on a vertically adjustable block 70 that is mounted between the two plates 35 and 61 and this block has two vertical slots 70′ for the passage of the bolts 62 so that the block may be vertically adjusted in order to be engaged immediately under the delivery slide and then locked firmly in place. The adjustability of the slide supporting block is of importance in that it permits the use of a slide of a greater thickness as shown at 60′ in Fig. 12, and provided with large delivery openings such as might be employed in the planting of beans. This slide 60′ may be readily substituted for the slide 60 by simply lowering the supporting block 70, but in such cases a more appropriate form of feed hopper would, of course, be employed. The central portion of the block 70 has a central opening or recess 72 through which the seed may fall from the delivery openings of the slides, and the seed will drop into the guiding members 50 in order to be directed into the furrow.

In order to permit ready interchanging of the slides each delivery slide is provided with a receiving eye 74 for the reception of a pin 75 at the forward end of the connecting rod 39′. It will be observed that the forward end of the rod 39′ is bifurcated to form a pair of spring tongues which have an inherent tendency to spring apart and each tongue carries one of the pins 75. It is an easy matter to disconnect the slides by simply grasping or pressing the tongues together so as to withdraw the pins from the receiving eyes of the slides.

The main hopper 32 is in the form of a rectangular casing that fits entirely around the plates 34 and 61, and is provided with dependent arms 78 that are secured to the sides of the members 34 and 61. The lower central portions of the ends of the hopper are provided with openings for the reception of a pivot bar 79 on which is mounted a plate 80 which may be adjusted to feeding position and which serves to divide the main hopper into two compartments, one above the main delivery slide 38 and the other above the auxiliary delivery slide 60. At one end of the dividing plate 80 is pivoted a lever 81 having at its lower end a projecting toe 82 which may enter any one of the openings 83 formed in the adjacent end plate of the hopper. One of these openings is in such position that the plate may be locked in vertical alinement with the pivot pin 79 as shown in Fig. 5 or it may be moved over to either of the two incline positions indicated by the dotted lines $x$ for the purpose of covering one hopper and increasing the capacity of the other.

In a machine of this type corn or any form of seed may be planted at any desired intervals and adjustment to accommodate different classes of seed or different spacing may be quickly accomplished.

What is claimed is:—

1. In a planter a hopper having a grooved bottom with oppositely inclined seed positioning side portions converging toward the groove thereof and a slide mounted for reciprocation in the said groove, and having at its edge a seed-receiving notch.

2. In a planter, a seed box including a pair of side plates having their adjacent edges tapered the side plates being spaced from each other to form a bottom groove, means for adjusting the plates to varying width in the groove, and interchangeable slides of different widths arranged to reciprocate in said groove, said slides being provided with seed receiving notches.

3. In a planter, a seed box comprising a pair of relatively adjustable side plates the upper inner edges of which are tapered to form a hopper, a slide arranged to reciprocate between the plates and provided with a seed receiving notch, and a spring actuated rejecting tongue mounted upon one of the plates and adapted to enter said notch.

4. In a planter, a seed box including a pair of plates spaced to form a groove, a reciprocatory slide mounted in the groove the inner face of one of the plates being provided with inclined surfaces, and adjustable wedges bearing between the opposite plate and said inclined surfaces to thereby adjust the width of the groove.

5. In combination, a seed box comprising a pair of plates spaced to form a slide receiving groove, a pair of slide supporting strips forming the bottom of the groove the inner face of one of the plates being inclined, adjustable wedges fitting against the flat portion of the plate, and securing bolts for clamping the plates in adjustable position.

6. In combination, a pair of plates spaced to form a groove the upper inner edges of the plates being recessed to form a pair of spaced hoppers one of said plates being slotted at a point in alinement with the groove, a pivot pin extending across the slot, a spring pressed tongue having a slot for the passage of the pin, a pair of springs tending to maintain the tongue in central position, and means for actuating the slide.

7. In a device of the class described, a pair of spaced plates, a block arranged between the plates and provided with vertical slots, bolts extending through the slots and openings in the plates, and serving as a means for clamping the block in adjusted position, a feed slide mounted on the block and provided with openings, a hopper carrying a bar arranged above the slide and means for locking said hopper carrying bar in position.

8. In combination, a pair of spaced plates, bars extending across and connecting the upper edges of said plates, a removable hopper carrying bar notched at its opposite ends for the reception of the cross bars, a feed slide arranged below the hopper carrying bar and provided with openings, and a vertically adjustable block mounted between the plates and forming a support for said slide.

9. In a machine of the class described, a frame, a bar having its forward end pivoted to the frame, means for guiding the rear end of the bar, a wheel, a stud carried by the bar and forming a support for the wheel, a crank pin on said wheel, a seed box carried by the bar, and a seed discharge mechanism operable from the crank pin.

10. In a machine of the class described, a frame comprising a pair of bars rigidly connected at their forward ends, slotted cross bars forming a connection for the rear ends of the frame bars, means for locking the slotted cross bars in adjusted position, handle bars connected to the frame and also having an adjustable connection to permit adjustment to correspond to the adjustment of the frame, a guiding bracket carried by the cross bars of the frame and adjustable therewith said bracket having a transversely disposed opening, a bar having an adjustable pivot at the forward end of the frame the rear end of said bar being guided by the bracket, a seed box mounted on the bar, a ground engaging wheel mounted on the bar, means operable from said wheel for discharging the seed, and a removable locking pin adapted to the bracket opening and serving to lock the bar in its lowest position.

In testimony that I claim the foregoing as my own, I have hereto affixed my signature in the presence of two witnesses.

JAMES R. MILLER.

Witnesses:
 WM. F. SALTER,
 JAS. M. WALKER.